United States Patent
Johansson

(10) Patent No.: US 8,250,228 B1
(45) Date of Patent: Aug. 21, 2012

(54) PAUSING OR TERMINATING VIDEO PORTION WHILE CONTINUING TO RUN AUDIO PORTION OF PLUG-IN ON BROWSER

(75) Inventor: Olof Johansson, Belmont, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/246,493

(22) Filed: Sep. 27, 2011

(51) Int. Cl.
*G06F 15/16* (2006.01)
*G06F 3/00* (2006.01)

(52) U.S. Cl. ......................................... 709/231; 715/719

(58) Field of Classification Search .................. 709/203, 709/231; 715/719, 777, 795
See application file for complete search history.

(56) References Cited

U.S. PATENT DOCUMENTS

| | | | | |
|---|---|---|---|---|
| 6,025,871 A * | 2/2000 | Kantor et al. | ............... | 348/14.07 |
| 7,574,628 B2 * | 8/2009 | Qassoudi | ........................ | 714/39 |
| 2005/0135476 A1 * | 6/2005 | Gentric et al. | ............. | 375/240.1 |
| 2005/0198364 A1 * | 9/2005 | Val et al. | ........................ | 709/236 |
| 2006/0271999 A1 * | 11/2006 | Wakako et al. | ................ | 725/135 |
| 2008/0046936 A1 * | 2/2008 | Dam et al. | ........................ | 725/88 |
| 2009/0042609 A1 * | 2/2009 | Bloebaum | .................. | 455/556.1 |
| 2011/0022984 A1 * | 1/2011 | van der Meulen et al. | ... | 715/830 |

OTHER PUBLICATIONS

Tanenbaum, "The Application Layer", Chapter 7, 2003 Pearson Education, Inc., pp. 612-616.
"Plug-in (computing)", Wikipedia, the free encyclopedia, Jun. 23, 2011, 5 pages.

* cited by examiner

*Primary Examiner* — Jerry Dennison
(74) *Attorney, Agent, or Firm* — Brake Hughes Bellermann LLP

(57) ABSTRACT

Various example embodiments are disclosed. According to an example embodiment, a non-transitory computer-readable medium may include computer-executable instructions stored thereon. When executed by at least one processor, the instructions may be configured to cause a computing system to receive, by a web browser, a file from a web server, the file including an instruction to launch a plug-in of the browser, launch the plug-in in an active state based on the instruction, provide a message to the plug-in indicating that the plug-in is hidden and is not displayed as visible by the web browser, and modify running of the plug-in from the active state based on the message.

22 Claims, 10 Drawing Sheets

PAUSING OR TERMINATING VIDEO PORTION WHILE CONTINUING TO RUN AUDIO PORTION OF PLUG-IN ON BROWSER

TECHNICAL FIELD

This description relates to tabbed or multi-window browsers.

BACKGROUND

Web browsers may allow users to open multiple tabs, each tab opening a Web page. The user may select a single tab which is visible at a given time. The browser may run plug-ins, such as Adobe Flash Player or Quicktime, to display content to a user, based on instructions in a web page. The plug-ins may run even though the page associated with the plug-in is not visible to the user, utilizing resources of the computing system without enhancing the user experience.

SUMMARY

According to one general aspect, a non-transitory computer-readable medium may include computer-executable instructions stored thereon. When executed by at least one processor, the instructions may be configured to cause a computing system to receive, by a web browser, a file from a web server, the file including an instruction to launch a plug-in of the browser, launch the plug-in in an active state based on the instruction, provide a message to the plug-in indicating that the plug-in is hidden and is not displayed as visible by the web browser, and modify running of the plug-in from the active state based on the message.

According to another general aspect, a non-transitory computer-readable medium may include instructions stored thereon. The instructions, when executed by at least one processor, may be configured to cause a computing system to install a plug-in onto a tabbed browser of the computing system. The plug-in may be configured to play or execute content received from a website via the browser receive a message from the browser indicating that a tab associated with the plug-in is hidden, and modify the playing or execution of the content based on the message indicating that the tab associated with the plug-in is hidden.

According to another general aspect, a non-transitory computer-readable medium comprising instructions stored thereon. When executed by at least one processor, the instructions may be configured to cause a computing system to run a tabbed browser. The browser may be configured to open a first web page within a first tab of the browser based on a first file received from a first website, open a second tab within the browser based on input received from a user, open a second web page within the second tab of the browser based on a second file received from a second website, the second file including at least one instruction to launch a plug-in, launch the plug-in based on the at least one instruction, return to the first web page within the first tab based on input received from the user, the returning to the first web page within the first tab including hiding the second web page and the second tab, and, based on the second web page and the second tab being hidden, send a message to the plug-in, the message being configured to cause the plug-in to modify its performance.

The details of one or more implementations are set forth in the accompanying drawings and the description below. Other features will be apparent from the description and drawings, and from the claims.

DETAILED DESCRIPTION

Figure 1:
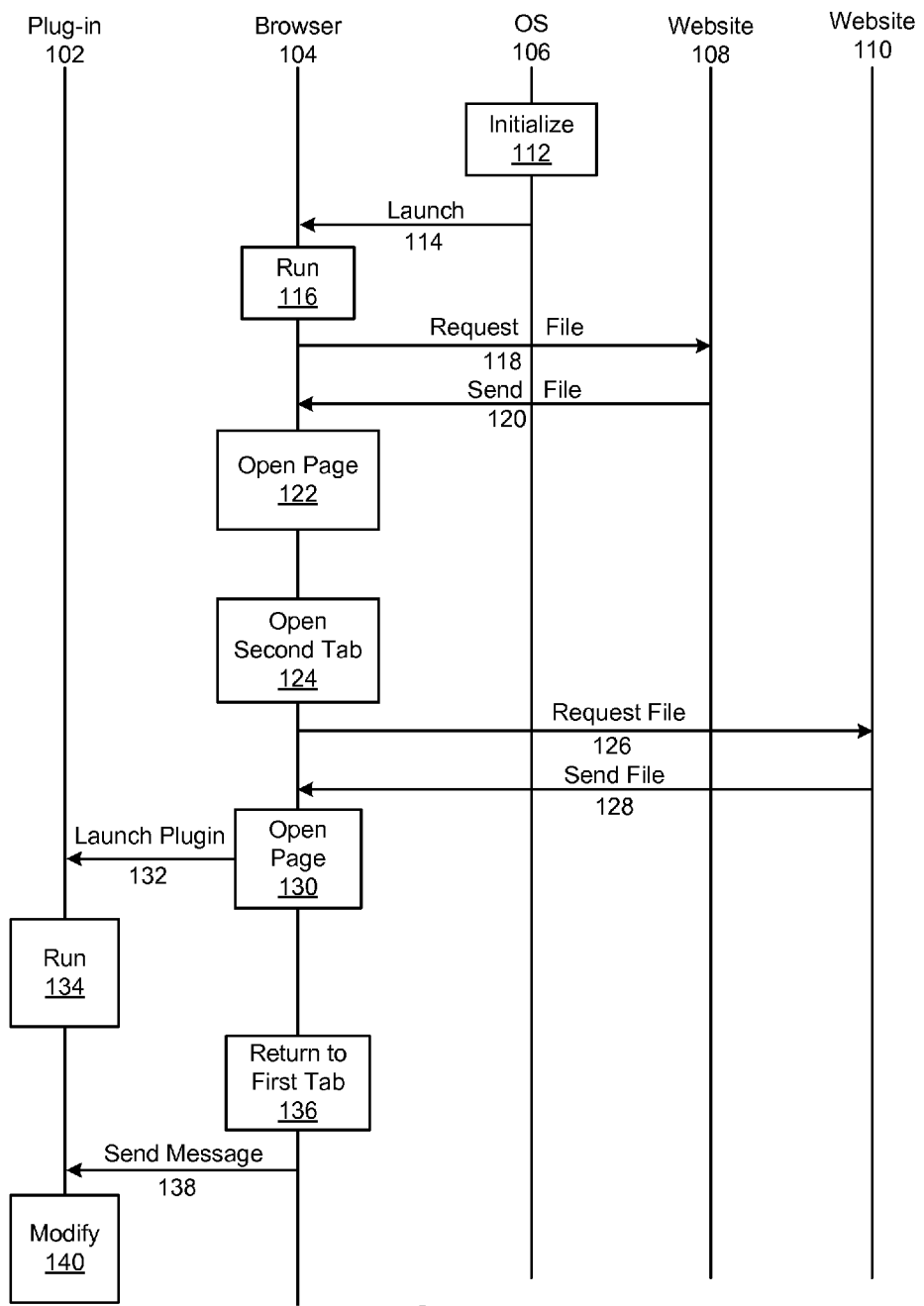
FIG. 1 is a vertical-time sequence diagram showing messages exchanged between, and functions performed by, software elements according to an example embodiment.

Computer users can view Internet content via the World Wide Web by opening a browser, such as Google Chrome, Internet Explorer, Apple Safari, Mozilla Firefox, or Netscape Navigator, and entering a website's domain name into a Uniform Resource Locator (URL) bar of the browser. The user's computer will send a request for a file, such as a request for a web page, to a web server which hosts the website. The web server will send the requested file, which may be a web page such as a Hypertext Markup Language (HTML) file, back to the user's computer. The user's computer may read the file, execute instructions included in the file, and display the web page on the browser.

The file may include one or more instructions to run or launch a plug-in. The plug-in may be a code module called by the browser, which runs inside the browser as an extension of the browser. The plug-in may enable the browser to perform additional functionalities, such as playing video or animations and/or audio content which the web server sent to the user's computer in response to the request. The content sent by the web server may have been included in the file, or may have been sent separately from the file which included the instruction(s) to launch the plug-in. Examples of plug-ins include the Adobe Flash Player, QuickTime, and Java. The plug-in may consume additional computing resources beyond those utilized by the browser, such as additional processing power, additional memory, additional data transmission and/or reception, and/or additional power. The plug-in may also instruct another application or program to run inside the plug-in; in the example of Flash, the plug-in may include a flash interpreter which notifies a flash executable to run.

Tabbed browsers may display web pages from multiple websites within a single instance or window of the browser. The tabbed browser may display a single page, with the other pages hidden from view. The titles of the hidden pages may be displayed on tabs within the browser, and available for the user to select or close. Active content, such as the plug-ins, may continue to run on the pages of tabs which are hidden. The browser described herein may terminate or modify the running of the plug-ins to conserve computing resources, such as power. The browser may, for example, terminate the running of the plug-in, may stop running a portion or feature of the plug-in, such as video content or animations, from running, or modify the running by reducing quality or bandwidth of video content or animations, while allowing another portion or feature of the plug-in, such as audio content, to run, while the user is viewing the content displayed on a visible tab. The browser may modify the running of the plug-in based on the tab associated with the plug-in being hidden, and/or based on other criteria, such as a battery or power level of the computing device upon which the browser is running. The present disclosure may also apply to multi-window browsers, which may display a single window, and the page displayed therein, and hide the remaining windows and their respective pages.

FIG. 1 is a vertical-time sequence diagram showing messages exchanged between, and functions performed by, software elements according to an example embodiment. In this example, an operating system (OS) 106 may initialize (112). The OS 106 may initialize in response to a computing system which runs the OS 106 powering on. The OS 106 may control access to hardware resources by programs running on the computing system, and may exercise some control over the programs running on the computing system, according to an example embodiment. The OS 106 may include Microsoft Windows, Linux, Google Chrome OS, Apple Mac OS (including Lion or Leopard), webOS, Windows Phone, BlackBerry OS, or Android, as non-limiting examples.

The OS 106 may launch a Web browser 104 (114). The OS 106 may launch the browser 104 based on a user requesting the OS 106 to launch the browser 104. The user may, for example, click on an icon representing the browser 104, select the browser 104 from a menu, or enter a command to run or launch the browser 104 from a command line interface.

The browser 104 may run (116) based on the OS 106 launching the browser 104. The browser 104 may open as a window within a screen or display controlled by the OS 106. The browser 104 may request files or web pages from remote web servers hosting websites, and display the web pages graphically to the user. The browser 104 may also display a name of the web page, include a field which displays a Uniform Resource Locator (URL) of the displayed web page and which allows the user to enter a URL which will be used to determine an Internet Protocol (IP) address of a web server from which a file may be requested, and may include navigation buttons. Examples of web browsers include Google Chrome, Internet Explorer, Safari, Mozilla Firefox, and Netscape Navigator, as non-limiting examples.

The browser 104 may request a file or web page from a website 108 (118). The browser 104 may request the file or web page based on a home page set to the browser 104, based on a user entering a URL for the website 108, or based on the user clicking on a hyperlink linked to the website 108, as non-limiting examples.

The website 108 may respond to the request by sending the file or web page to the browser 104 (120). The file or web page may include an HTML file with instructions for the browser 104 to execute. The file or web page may, for example, include instructions to display specified images, locations on the screen to display the images, and text. The website 108 may also send, as part of or separately from the file or web page, content, such as image files, for the browser 104 to display.

Upon receiving the file or first web page, the browser 104 may open or display the first page within the browser (122). The browser 104 may display the graphics and/or text, including hyperlinks, for viewing and navigation by the user, in accordance with the file or web page received from the website 108.

The user may navigate within the browser to other pages within the website 108, or to other websites altogether. At some point, the user may decide that he or she wants to have a second web page open within the browser 104. The user may issue a command for the browser 104 to open a second tab for displaying and/or displaying the second web page, such as by entering 'control-t' into the keyboard of the computing system or by clicking a tab button on the browser 104.

In response to the user issuing the command to open the second tab, the browser 104 may open the second tab (124). The second tab within the browser 104 may enable the browser 104 to open a second page within the browser 104 without leaving or closing the first page. The second tab may be visible within the browser 104, whereas the first tab, which displayed the first web page, may be hidden. The user may select which tab to display, and its associated page to view, and the browser 104 may respond by displaying the selected tab and associated page.

Within the second tab, the user may desire to view another web page. The user may, for example, enter a second URL into the URL field of the browser 104. The browser 104 may respond to the user entering the URL by requesting a file or web page from a website 110 which is associated with the entered URL (126). The website 110 may respond by sending the file or web page to the browser 104 (128).

The file or web page sent by the website 110 to the browser 104 may be an HTML file. The file may include instructions to display graphics, text, video, animations, and/or audio content. The file may also include one or more instructions to launch one or more plug-ins 102. The plug-in(s) 102 may be a code module that the browser 104 launches by fetching the plug-in 102 from a special directory on a disk (which also stores the browser 104); the browser 104 may have previously installed the plug-in 102 as an extension to the browser 104. The plug-in 102 may run inside the browser 104, and may have access to the page displayed by the browser 104 and modify the appearance of the page displayed by the browser 104. The plug-in 102 may be multi-level, including one or more programs or applications which run inside the plug-in 102. The plug-in 102, and any programs running inside the plug-in 102, may utilize memory allocated to the browser 104, and may interface with the browser 104.

The plug-in 102 may interface with the browser 104 by, for example, receiving content such as video or animations and/or audio which the browser 104 has received from a website(s) 108, 110. The plugin 102 may also download and/or receive the data or content directly from the website(s) 108, 110 based on information provided to the plug-in 102 by the browser 104, bypassing the browser 104, or the plug-in 102 may receive the data or content from the website(s) 108, 110 via the browser 104. The plug-in 102 may play the video or animations and/or audio content received from the browser 104. The plug-in 102 may also receive messages from the browser 104, such as whether a page which launched (or included the instruction to launch) the plug-in 102 is currently the visible or displayed page or tab, a remaining battery power level of the computing system running the plug-in 102, and/or whether to modify the running of the plug-in 102 (and/or programs or applications running inside the plug-in 102). The running of the plug-in 102 may be modified by terminating or pausing the running of the plug-in 102, or terminating running a portion or feature of the plug-in 102, such as by stopping playing the video content or animations but continuing to play the audio content. The running of the plug-in 102 may also be modified by the plug-in 102 requesting the website 110 to stop streaming content, such as video and/or audio content, according to an example embodiment. Or, the running of the plug-in 102 may be modified by the plug-in 102 reducing a video quality and/or requesting the website 110 to reduce the data rate or bandwidth at which the content is streamed, according to an example embodiment.

Upon receiving the file or web page from the website 110, the browser 104 may open the page (130). As discussed above, the file or web page may include an instruction to launch the plug-in 102. In accordance with the instruction to launch the plug-in 102, the browser 104 may launch the plug-in 102 (132). Upon launch, the plug-in 102 may begin running (134). The plug-in 102 may run by executing features associated with the plug-in 102, such as, for example, playing video and/or audio content, or executing downloaded programs. The video or animations and/or audio content may have been included in or sent along with the file received by the browser 104, or the website 110 may continuously stream the content to the browser 104 or to the plug-in 102.

After (or during) viewing and/or listening to the content of the page received from the website 110, the user may wish to return to viewing and/or listening to the content of the page previously received from the website 108. The user may instruct the browser 104 to display the first tab, such as by clicking on the first tab. The browser 104 may respond by returning to or displaying the first tab (136), thereby hiding the second tab which includes the page which launched the plug-in 102.

Continuing to run the plug-in 102, while the page or tab which is running the plug-in 102 is hidden, may waste resources of the computing system which is running the browser 104 and plug-in 102. Modifying the running of the plug-in 102 while the tab or page associated with or running the plug-in 102 is hidden or not visible may save computing resources. To save computing resources by modifying the running of the plug-in 102, the browser 104 may send a message to the plug-in 102 (138).

The message that the browser 104 sends to the plug-in 102 may indicate that the page or tab associated with or running the plug-in 102 is not visible, allowing the plug-in 102 to act on the information by modifying how the plug-in 102 is running. Or, the message may include an instruction, such as how the plug-in 102 should modify its running. The message may also prompt the plug-in 102 to modify its running if a power level of a battery of a computing system upon which the plug-in 102, browser 104, and OS 106 are running, is at or below a threshold level. The check and/or comparison of the battery level to the threshold may be performed by any of the plug-in 102, browser 104, and/or OS 106, based on the page or tab associated with running the plug-in 102 being hidden, and the running of the plug-in 102 may be modified if the two conditions are met, namely, the page or tab associated with the running the plug-in 102 being hidden and the battery or power level being at or below a threshold, according to an example embodiment. Or, rather than comparing the battery level to the threshold, the running of the plug-in 102 may be modified if the page or tab associated with the running the plug-in 102 is hidden and the computer running the plug-in 102 is running on battery power rather than AC power (such as because the computer has been unplugged).

The tab or page running the plug-in 102 may be considered hidden based on another tab within the browser 104 being selected, based on a separate window of the browser 104 being selected, or based on another window controlled by the OS 106, such as another instance of a browser or another program, such as a word processing program, spreadsheet program, calendar program, or email program, being moved in front of the window which displays the browser 104. The running of the plug-in 102 may be modified based on another program's window moving in front of the browser 104, hiding the browser 104 so that the browser 104 is not longer visible to the user, or moving the browser 104 off of a visible portion of a screen controlled by the OS 106, according to example embodiments.

The plug-in 102 may respond to receiving the message by modifying the manner in which the plug-in 102 runs (140). For example, the plug-in 102 may stop running based on receiving the message, pause running based on receiving the message, stop or pause running a portion of the plug-in 102, such as stopping or pausing playing video content or animations while still playing audio content, and/or sending a message to the website 110 requesting or instructing the website 110 to stop streaming data or content to the plug-in 102 via the browser 104.

The user may also reopen the tab of the browser 104 which displays the page which runs or launched the plug-in 102. The plug-in 102 may return to the active or running state when the tab from which the plug-in 102 is running is reopened. For example, the plug-in 102 may resume running, resume playing the video content or animations, and/or request the website 110 to resume streaming the content. The plug-in 102 may alternate between the active or original state and the inactive or modified state based on whether the tab of the browser 104 from which the plug-in 102 is running is visible or hidden, according to an example embodiment.

In an example embodiment, rather than (or in addition to) sending a message to the plug-in 102 to modify the running of the plug-in 102, the browser 104 may modify or stop running active or dynamic content or the web page, while still presenting static content. Dynamic content may include information or content which changes without the user or browser 104 refreshing or requesting a new page or file from the website 110. In an example embodiment, the browser 104 may stop receiving updated information or content from the website 110 until the user refreshes the browser 104 instead of, or in addition to, modifying running of the plug-in 102 when the tab is hidden and/or not visible.

Figure 2:
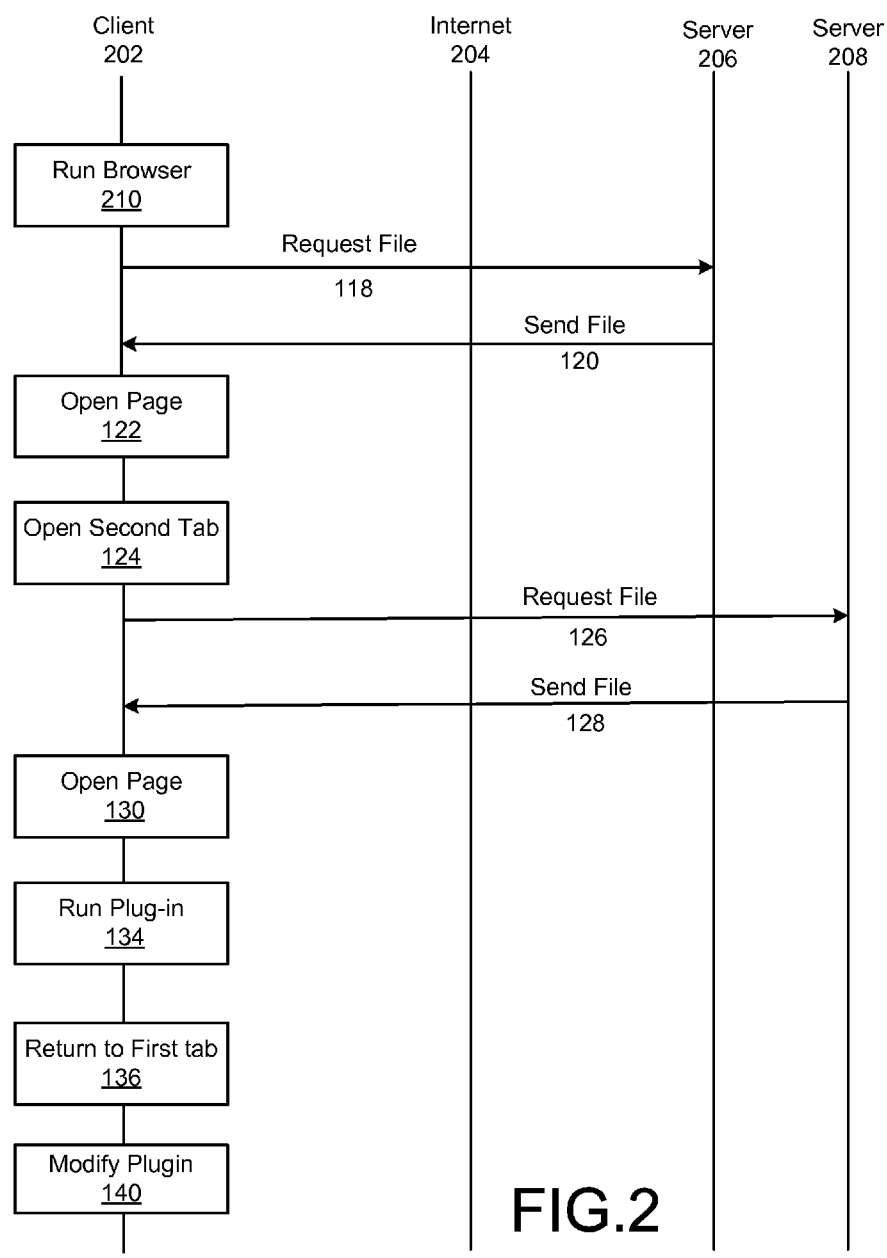
FIG. 2 is a vertical-time sequence diagram showing messages exchanged between, and functions performed by, hardware elements according to an example embodiment.

FIG. 2 is a vertical-time sequence diagram showing messages exchanged between, and functions performed by, hardware elements according to an example embodiment. In this example, a client computer 202 may include the plug-in 102, browser 104, and operating system 106 discussed above. The client computer 202 may include, for example, a server, a desktop or tower computer, a notebook or laptop computer, a tablet computer, a personal digital assistant (PDA), smartphone, or any other computing device capable of implementing a browser 104 and at least one plug-in 102. The client computer 202 may interface with the user, by presenting output to the user including the browser 104 and receiving input from the user via the browser 104, as discussed above with reference to FIG. 1.

The client computer 202 may run the browser 104 (210). While running, the browser 104 run by the client computer 202 may, for example, request a file or web page from a website 108 hosted by a web server 206 (118), based on instructions and/or input received from the user, as discussed above with respect to FIG. 1. The browser 104 run by the client computer 202 may send the request to the website 108 hosted by the web server 206 via a network such as the Internet 204. The Internet 204 may include, for example, routers including points of presence, regional internet service providers, one or more backbone operators, and/or internal networks via which messages and files can be sent and received. The website 108 hosted by the web server 106 may send the requested file or web page to the browser 104 running on the client computer 202 via the Internet 204 (120), as discussed above with respect to FIG. 1.

After receiving the file or web page, the browser 104 running on the client computing device 202 may open the page within the browser 104 (122), as discussed above with respect to FIG. 1. The browser 104 running on the client computer device 202 may also open a second tab based on instructions and/or input from the user (124), as discussed above with respect to claim 1.

After opening the second tab, the browser 104 running on the client computing device 202 may request a file or web page from another website 110, which may be running on a different web server 208 (126), as discussed above with respect to FIG. 1. The browser 104 running on the client computing device 202 may send the request to the website 110 hosted by the web server 208 via the Internet 204. The website 110 hosted by the web server 208 may respond to the request by sending the requested file or web page to the browser 104 running on the client computing device 202 (128), as discussed above with respect to FIG. 1.

After receiving the file or web page from the website 110 hosted by the web server 208, the browser 104 running on the client computing device 202 may open the page (130) and run the plug-in 102 (134), as discussed above with respect to FIG. 1. The browser 104 running on the client computing device 202 may return to the first tab (136) and modify the running of the plug-in 102 (140), as discussed above with respect to FIG. 1. The browser 104 running on the client computing device 202 may alternate between displaying and hiding the tab running the plug-in 102, and alternate the plug-in 102 between the active or original state and the inactive or modified state based on whether the tab running the plug-in 102 is visible or hidden, as discussed above with respect to FIG. 1, according to an example embodiment.

In an example embodiment, when the tab running the plug-in 102 is hidden, the browser 104 may modify the running of the plug-in 102 or active content based only on the remaining battery power, or based on whether the client computer 202 is running on battery or AC power. For example, if the client computer 202 is running on battery (such as because the client computer 202 has been unplugged), the browser 104 may run video content at a lower resolution, thereby saving processing resources and battery power. The browser 104 may query the OS 106 regarding whether the client computer 202 is running on battery or AC power, and/or what the remaining level of battery power is, and the OS 106 may respond with the power status (battery or AC, and/or remaining battery power), or the OS 106 may push this information to the browser 104, according to an example embodiment.

FIGS. 3A-D show the browser 104 in various states after opening a first web page within a first tab, opening a second tab, opening a second web page within the second tab, and moving the first tab to the front, making the first web page in the first tab visible and the second page in the second tab hidden.

Figure 3A:
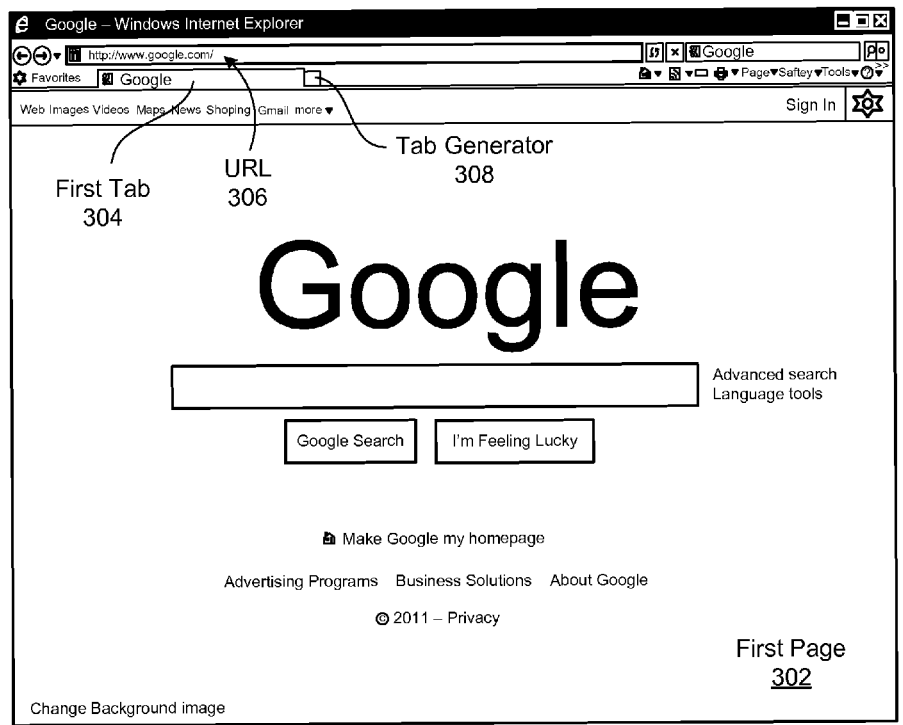
FIG. 3A is a screenshot showing a first page displayed within a first tab of a browser according to an example embodiment.

FIG. 3A is a screenshot showing a first page 302 displayed within a first tab 304 of the browser 104 according to an example embodiment. The browser 104 may display the first page 302 within the first tab 304 based on the user entering a URL, such as www.google.com in the example shown in FIG. 3A, into a URL field 306, and the browser 104, in response to the user entering the URL into the URL field 306, requesting a file or web page from a website 108 identified based on the entered URL (118), receiving the file or web page from the website 108 (120), and opening the page 302 (122) after receiving the file or web page from the server 206 hosting the website 108, www.google.com. The first page 302 may include buttons, fields, and hyperlinks via which the user may interact with the browser 104. The browser 104 may also include a tab generator button 308. The browser 104 may generate a second tab, shown in FIG. 3B, in response to the user clicking on the tab generator button 308.

Figure 3B:
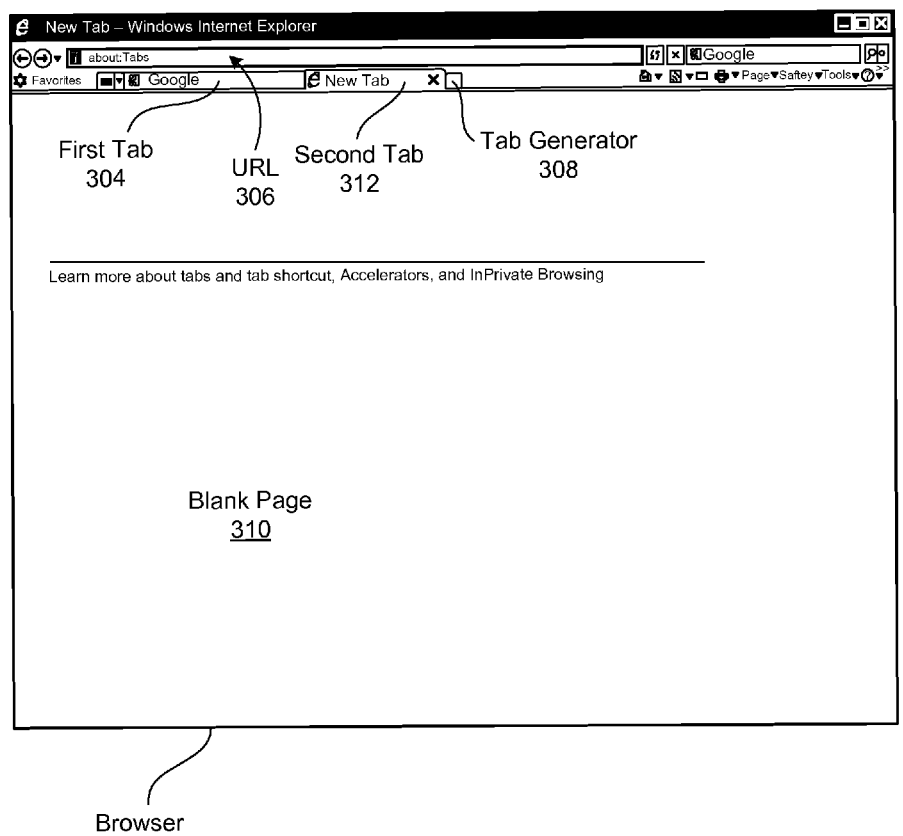
FIG. 3B is a screenshot showing a blank page within a second tab opened within the browser of FIG. 3A according to an example embodiment.

FIG. 3B is a screenshot showing a blank page 310 within a second tab 312 opened within the browser 104 of FIG. 3A according to an example embodiment. The browser 104 may have opened the second tab 312 (124) based on the user clicking on the tab generator button 308 when the first page 302 was open and the first tab 304 was the only tab open in the browser 104. Opening the second tab 312 may have caused the first tab 304 (and/or the first page 302 displayed in the first tab 304) to become hidden. While the first page 302 and/or first tab 304 is hidden, the title of the first page 302 may still be displayed in the first tab 304, reminding the user of the name of the first page 302 so that the user may return to the first page 302, if desired. The user may make the first page 302 and/or first tab 304 visible by clicking on the first tab 304. As shown in FIG. 3B, the second tab 312 may not display any web page because the user has not yet entered a URL into the URL field 306.

Figure 3C:
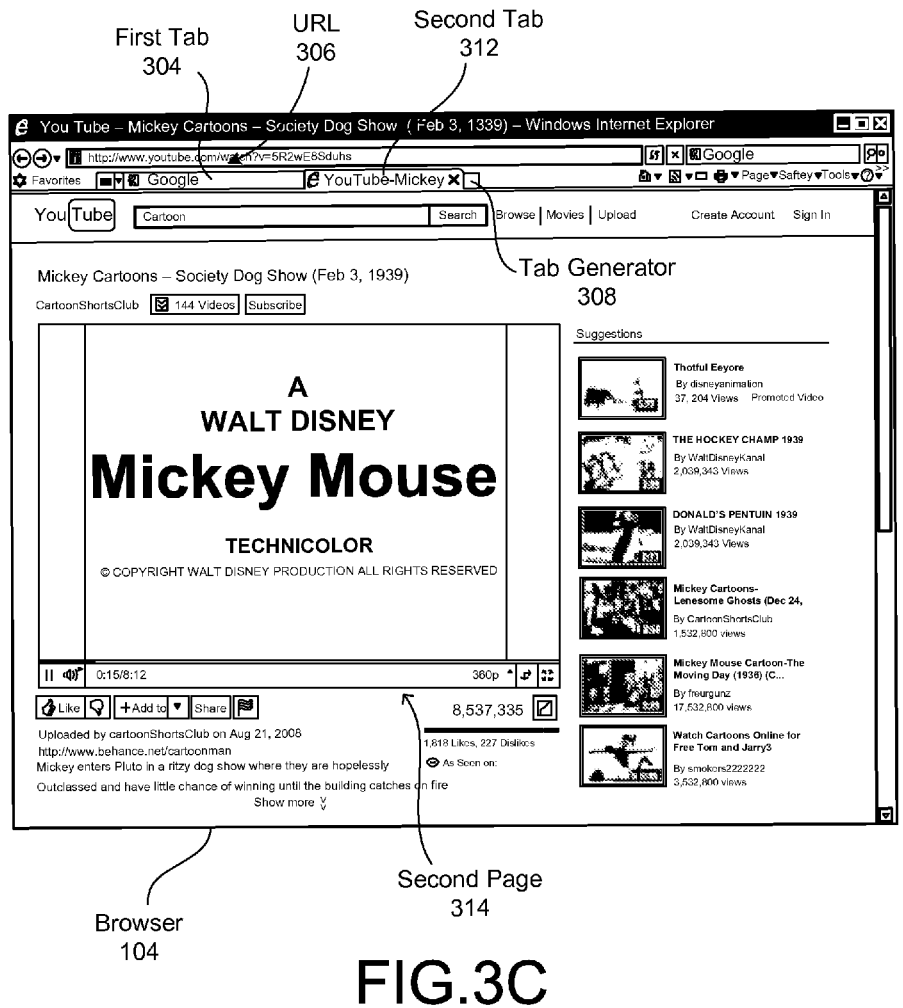
FIG. 3C is a screenshot showing a second page displayed within the second tab of the browser of FIGS. 3A and 3B according to an example embodiment.

FIG. 3C is a screenshot showing a second page 314 displayed within the second tab 312 of the browser 104 of FIGS. 3A and 3B according to an example embodiment. In this example, the user may have entered a URL into the URL field 306 of the browser 104, and/or requested a search and selected the video, "Mickey Cartoons . . . ." In response to the user entering the URL into the URL field 306, and/or requesting the search, the browser 104 may have requested a file or web page from the website 110 www.youtube.com hosted by the server 208 based on the URL (126), and the website 110 may have sent the file or web page in response to the request (128). After receiving the file or web page, the browser 104 may have opened the second page 314 (130).

The second page 314 may require a plug-in 102 to run content. The file sent by the website 110 may include an instruction to launch a specified plug-in 102 to play video content or animations. For example, the file may require the browser 104 to launch the Adobe Flash Player plug-in 102. Based on this instruction, the browser 104 may launch the Adobe Flash Player plug-in 102 (132), the plug-in 102 may run within the browser 104 (134), and the second page 314 may play the video content or animations within the second tab 312 of the browser 104. This running by the plug-in 102 may enable the browser 104 to play the video content or animations received from the website 110.

While the plug-in 102 is running and the browser 104 is playing the video content or animations, the user may wish to return to the first page 302. The user may, for example, click in the first tab 304. The browser 104 may respond to the user clicking on the first tab 304 by returning to the first tab 304 (136), such as by making the first tab 304 visible and making the second tab 312 hidden.

Figure 3D:
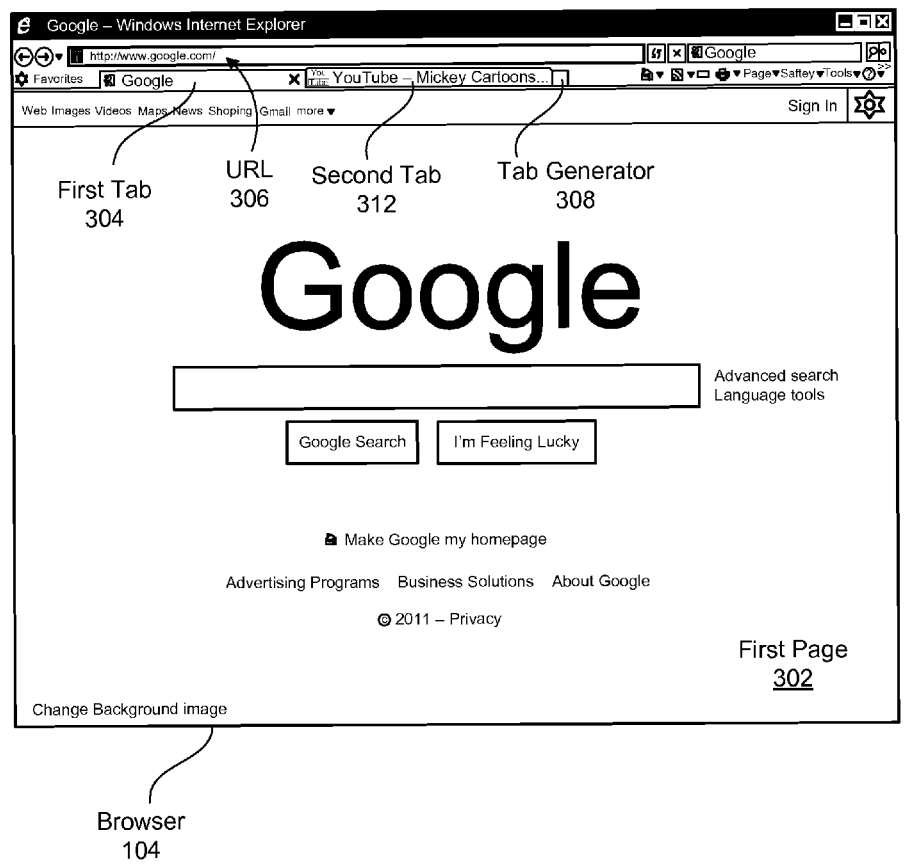
FIG. 3D is a screenshot showing the first page displayed within the first tab of the browser of FIGS. 3A, 3B, and 3C after the second tab has been hidden according to an example embodiment.

FIG. 3D is a screenshot showing the first page 302 displayed within the first tab 304 of the browser of FIGS. 3A, 3B, and 3C after the second tab 312 has been hidden according to an example embodiment. Here, the second page 314 is not longer visible. Running the plug-in 102 would unnecessarily utilize computing resources to play the video content or animations which the user cannot see because the second page 314 is hidden. To conserve computing and/or network resources, the browser 104 may modify the running of the plug-in 102. For example, the browser 104 may terminate the running of the plug-in 102, thereby stopping the video content or animation(s) associated with the second page 314 from running. The browser 104 may establish a clock or reference time so that the video content will resume at a later point in the video if the user reopens the second tab 312, making the video appear to the user as if the video had been running in the background, or the video may stop running while the second tab 312 and second page 314 are not visible, and resume running when the user reopens the second tab 312 and second page 314. Or, the plug-in 102 may stop running video content but continue running the audio content, so that the user can still hear the audio portion of the video while viewing the first page 302.

The browser 104 and/or plug-in 102 may modify the running of the plug-in 102 based solely on the second tab 312 being hidden, or the hiding of the second tab 312 may be a condition for making a determination of whether to modify the running of the plug-in 102. For example, the client computing device 202 may, in response to the second tab 312 from which the plug-in 102 was launched being hidden, check a power level of a battery of the client computing device 202 against a threshold. If the power level is at or below the threshold, then the running of the plug-in 102 may be modified.

Figure 4:
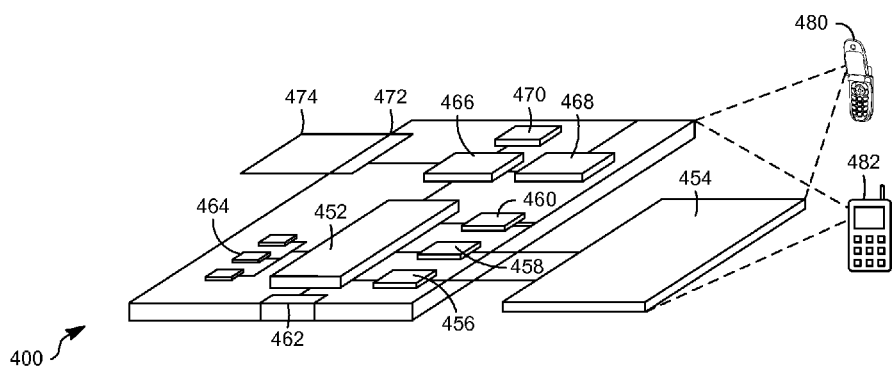
FIG. 4 shows an example of a generic computer device which may be used with the techniques described here.

FIG. 4 shows an example of a generic computer device 400 which may be used with the techniques described here. Computing device 400 is intended to represent various forms of mobile devices, such as personal digital assistants, tablet computers, cellular telephones, smart phones, and other similar computing devices. The components shown here, their connections and relationships, and their functions, are meant to be exemplary only, and are not meant to limit implementations of the inventions described and/or claimed in this document.

Computing device 400 includes a processor 452, memory 464, an input/output device such as a display 454, a communication interface 466, and a transceiver 468, among other components. The device 400 may also be provided with a storage device, such as a microdrive or other device, to provide additional storage. Each of the components 400, 452, 464, 454, 466, and 468, are interconnected using various buses, and several of the components may be mounted on a common motherboard or in other manners as appropriate.

The processor 452 can execute instructions within the computing device 400, including instructions stored in the memory 464. The processor may be implemented as a chipset of chips that include separate and multiple analog and digital processors. The processor may provide, for example, for coordination of the other components of the device 400, such as control of user interfaces, applications run by device 400, and wireless communication by device 400.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 400 with other devices. External interface 462 may provide, for example, for wired communication in some implementations, or for wireless communication in other implementations, and multiple interfaces may also be used.

The memory 464 stores information within the computing device 400. The memory 464 can be implemented as one or more of a computer-readable medium or media, a volatile memory unit or units, or a non-volatile memory unit or units. Expansion memory 474 may also be provided and connected to device 400 through expansion interface 472, which may include, for example, a SIMM (Single In Line Memory Module) card interface. Such expansion memory 474 may provide extra storage space for device 400, or may also store applications or other information for device 400. Specifically, expansion memory 474 may include instructions to carry out or supplement the processes described above, and may include secure information also. Thus, for example, expansion memory 474 may be provided as a security module for device 400, and may be programmed with instructions that permit secure use of device 400. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452, that may be received, for example, over transceiver 468 or external interface 462.

Device 400 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 400, which may be used as appropriate by applications running on device 400.

Device 400 may also communicate audibly using audio codec 460, which may receive spoken information from a user and convert it to usable digital information. Audio codec 460 may likewise generate audible sound for a user, such as through a speaker, e.g., in a handset of device 400. Such sound may include sound from voice telephone calls, may include recorded sound (e.g., voice messages, music files, etc.) and may also include sound generated by applications operating on device 400.

The computing device 400 may be implemented in a number of different forms, as shown in the figure. For example, it may be implemented as a cellular telephone 480. It may also be implemented as part of a smart phone 482, personal digital assistant, or other similar mobile device.

Figure 5:
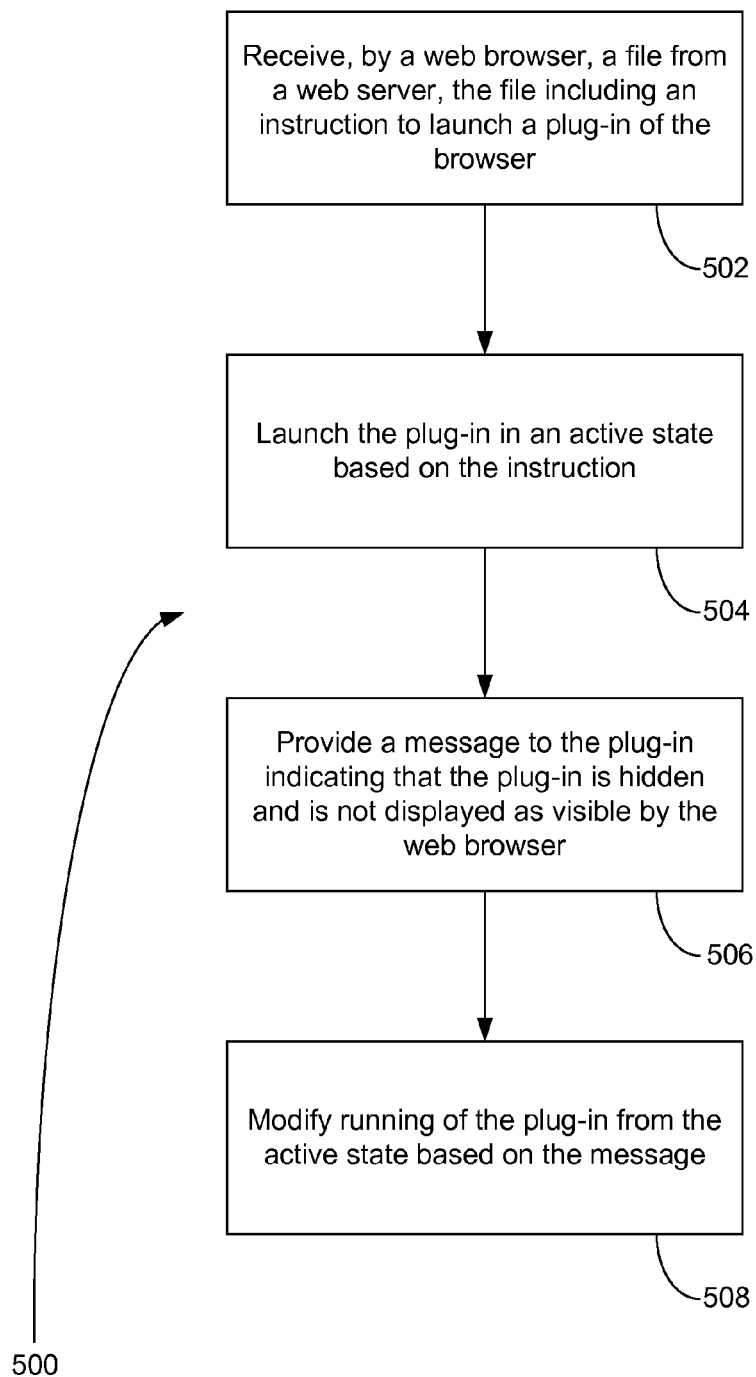
FIG. 5 is a flowchart showing a method performed by a computing system according to an example embodiment.

FIG. 5 is a flowchart showing a method 500 performed by a computing system according to an example embodiment. According to an example embodiment, the method 500 may include receiving, by a computing system 202 via a web browser 104, a file from a web server 208, the file including an instruction to launch a plug-in 102 of the browser 104 (502). The method 500 may also include launching the plug-in 102 in an active state based on the instruction (504). The method

500 may also include providing a message to the plug-in 102 indicating that the plug-in 102 is hidden and is not displayed as visible by the web browser 104 (506). The method 500 may also include modifying running of the plug-in 102 from the active state based on the message (508).

According to an example embodiment, the web browser 104 may include a tabbed web browser.

According to an example embodiment, the received file may include a Hypertext Markup Language (HTML) file.

According to an example embodiment, the message may instruct the plug-in 102 to modify the running of the plugin 102.

According to an example embodiment, the message to the plug-in 102 may indicate that the plug-in 102 is running on a hidden tab 312 which is not displayed as a visible tab of the web browser 104.

According to an example embodiment, the web browser 104 may provide the message to the plug-in 102.

According to an example embodiment, the modifying the running of the plug-in (508) may include the plug-in 102 sending a stop message to the web server 208, the stop message instructing the web server 208 to stop streaming data to the computing system 202.

According to an example embodiment, the modifying running of the plug-in from the active state based on the message (508) may include terminating running of the plug-in 102 based on the message.

According to an example embodiment, the modifying running of the plug-in 102 from the active state based on the message (508) may include terminating running of a video portion of the plug-in 102 while continuing to run an audio portion of the plug-in 102.

According to an example embodiment, the modifying running of the plug-in 102 from the active state based on the message (508) may include pausing running of a video portion of the plug-in 102 while continuing to run an audio portion of the plug-in 102.

According to an example embodiment, the modifying running of the plug-in 102 (508) may include removing the plug-in 102 from a portion of memory allocated to the web browser 104.

According to an example embodiment, the method 500 may further include providing a second message to the plug-in 102 indicating that the plugin 102 is running on a visible tab 312 which is displayed as a visible tab of the browser 104, and resuming running of the plug-in 102 in the active state based on the second message.

According to an example embodiment, the method 500 may further include comparing remaining battery power to a threshold, and providing the message to the plug-in 102 based on the remaining battery power being at or below the threshold.

According to an example embodiment, the method 500 may further include determining whether the plugin 102 is running on a hidden tab 312 of the browser 104 or is running on a visible tab of the browser 104.

According to an example embodiment, the file received from the web server 208 may include video content, the plug-in 102 may display the video content within the web browser 104 when the plug-in 102 is in the active state, and the plug-in 102 may stop displaying the video content when the plug-in 102 is modified from running in the active state.

Figure 6:
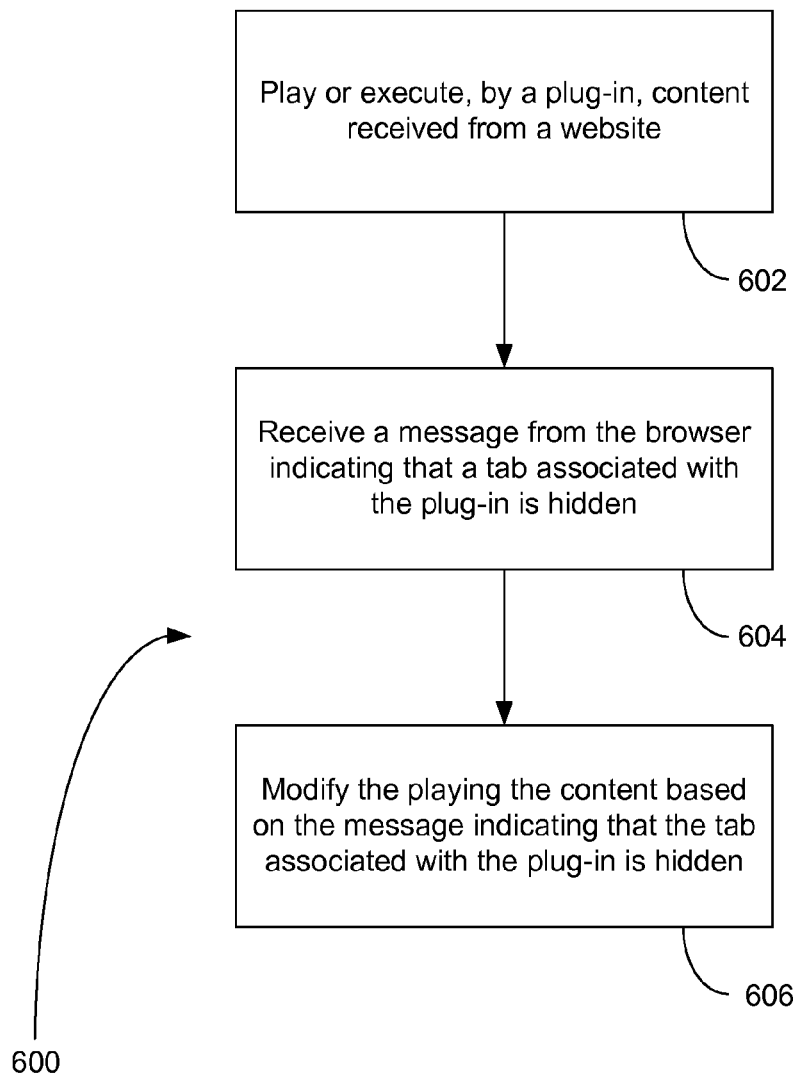
FIG. 6 is a flowchart showing a method performed by a plug-in according to an example embodiment.

FIG. 6 is a flowchart showing a method 600 performed by a plug-in 102 according to an example embodiment. In an example embodiment, the method 600 may include playing or executing content received from a website 110 either directly or via a browser 104 (602). The method 600 may also include receiving a message from the browser 104 indicating that a tab 312 or window associated with the plug-in 102 is hidden (604) and/or not displayed as visible by the browser 104. The method 600 may also include modifying the playing or execution of the content based on the message indicating that the tab 312 associated with the plug-in 102 is hidden (606).

According to an example embodiment, the browser 104 may include a tabbed browser, and the message may indicate that a tab 312 associated with the plug-in 102 is hidden.

According to an example embodiment, the method 600 may also include receiving the message from the browser 104 indicating that the tab 312 associated with the plug-in 102 is hidden and that a power level of the computing system 202 is at or below a threshold, and modifying the playing the content based on the message indicating that the tab 312 associated with the plug-in 102 is hidden and that the power level of the computing system 202 is at or below the threshold.

According to an example embodiment, the modifying playing the content may include stopping playing the content based on the message indicating that the tab 312 associated with the plug-in 102 is hidden.

According to an example embodiment, the modifying playing the content may include stopping playing a video portion of the content and continuing playing an audio portion of the content based on the message indicating that the tab 312 associated with the plug-in 102 is hidden.

Figure 7:
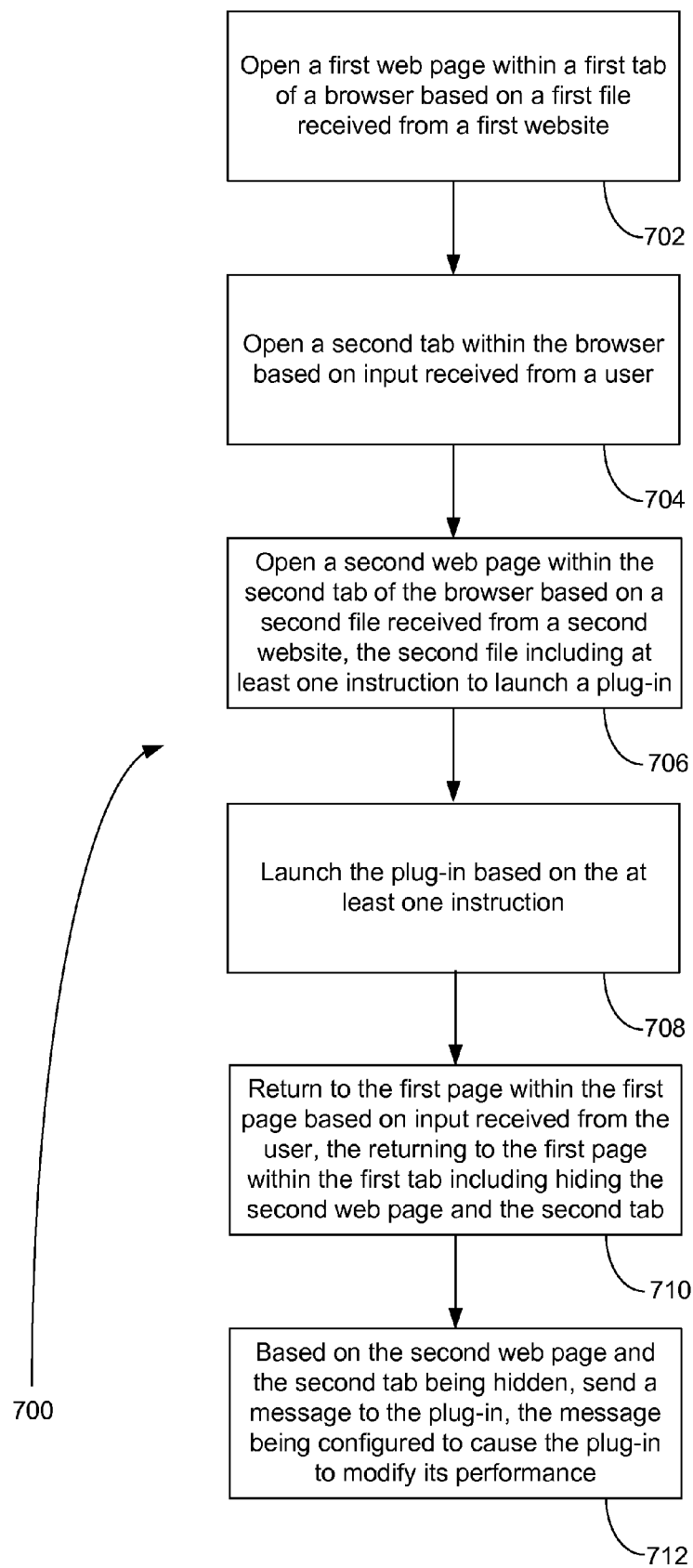
FIG. 7 is a flowchart showing a method performed by a browser according to an example embodiment.

FIG. 7 is a flowchart showing a method 700 performed by a browser 104 according to an example embodiment. According to an example embodiment, the method 700 may include opening a first web page 302 within a first tab 304 of the browser 104 based on a first file received from a first website 108 (702). The method 700 may also include opening a second tab 312 within the browser 104 based on input received from a user (704). The method 700 may also include opening a second web page 314 within the second tab 312 of the browser 104 based on a second file received from a second website 110, the second file including at least one instruction to launch a plug-in 102 (706). The method 700 may also include launching the plug-in 102 based on the at least one instruction (708). The method 700 may also include returning to the first web page 302 within the first tab 304 based on input received from the user, the returning to the first web page 302 within the first tab 304 including hiding the second web page 314 and the second tab 312 (710). The method 700 may also include, based on the second web page 314 and the second tab 312 being hidden, sending a message to the plug-in 102, the message being configured to cause the plug-in 102 to modify its performance (712).

According to an example embodiment, the sending the message to the plug-in 102 may be based on the second web page 314 and the second tab 312 being hidden and based on a power level of the computing system 202 running the browser 104 and plug-in 102 being at or below a threshold.

According to an example embodiment, wherein the message may be configured to cause the plug-in 102 to stop playing video content.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input. Or, a tablet or smartphone with a touchscreen, in which the user provides input onto the display, may both provide output to, and receive output from, the user.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A non-transitory computer-readable medium comprising instructions stored thereon that, when executed by at least one processor, are configured to cause a plug-in to:
   play or execute content received from a website via a first tab or a first page of a browser, the content including a video portion and an audio portion; and
   pause or terminate the video portion while continuing to play or execute the audio portion based on the first tab or the first page of the browser running the plug-in becoming hidden.

2. The computer-readable medium of claim 1, wherein the plug-in is configured to pause or terminate the video portion while continuing to play or execute the audio portion based on the first tab or the first page of the browser running the plug-in becoming hidden and a power level of a computing system running the plug-in being at or below a threshold.

3. The computer-readable medium of claim 1, wherein the plug-in is configured to pause the video portion while continuing to play or execute the audio portion based on the first tab or the first page of the browser running the plug-in being hidden.

4. The computer-readable medium of claim 1, wherein the plug-in is configured to terminate the video portion while continuing to play or execute the audio portion based on the first tab or the first page of the browser running the plug-in being hidden.

5. A non-transitory computer-readable medium comprising instructions stored thereon that, when executed by at least one processor, are configured to cause a computing system to run a browser, the browser being configured to:
   open a first web page within the browser based on a first file received from a first website, the first file including at least one instruction to launch a plug-in;
   launch the plug-in based on the at least one instruction; and
   based on the first web page being hidden, send a message to the plug-in, the message being configured to cause the plug-in to pause or terminate a video portion of the plug-in while continuing to run an audio portion of the plug-in.

6. The computer-readable medium of claim 5, wherein the browser is configured to send the message to the plug-in based on the web page being hidden and based on a power level of the computing system being at or below a threshold.

7. The computer-readable medium of claim 5, wherein the browser is configured to send a second message to the plug-in based on the first web page becoming visible, the second message being configured to cause the plug-in to resume playing the video portion.

8. The computer-readable medium of claim 5, wherein the browser is configured to:
   open the first web page within a first tab of the browser based on the first file received from the first website, the first file including the at least one instruction to launch the plug-in;
   launch the plug-in based on the at least one instruction;
   open a second tab of the browser based on input received from a user, the opening second tab including hiding the first web page and the first tab; and
   based on the first web page and the first tab being hidden, send the message to the plug-in, the message being configured to cause the plug-in to pause or terminate the video portion of the plug-in while continuing to run the audio portion of the plug-in.

9. The computer-readable medium of claim 5, wherein the browser is further configured to send a video stop message to the first website, the stop video message instructing the first website to stop streaming video data to the computing system.

10. The computer-readable medium of claim 1, wherein the plug-in is configured to:
- receive a message from the browser indicating that the first tab or the first page of the browser running the plug-in is hidden; and
- pause or terminate the video portion while continuing to play or execute the audio portion based on receiving the message indicating that the first tab or the first page of the browser running the plug-in is hidden.

11. The computer-readable medium of claim 1, wherein the plug-in is further configured to resume playing or executing the video portion based on the first tab or the first page of the browser running the plug-in becoming visible.

12. The computer-readable medium of claim 1, wherein the plug-in is further configured to send a video stop message to the website, the video stop message instructing the website to stop streaming video data to a computing system running the plug-in.

13. An apparatus comprising:
- at least one processor; and
- at least one memory device, the at least one memory device comprising executable code stored thereon that, when executed by the at least one processor, is configured to cause a browser executed by the apparatus to:
  - open a first web page within the browser based on a first file received from a first website, the first file including at least one instruction to launch a plug-in;
  - launch the plug-in based on the at least one instruction; and
  - based on the first web page being hidden, send a message to the plug-in, the message being configured to cause the plug-in to pause or terminate a video portion of the plug-in while continuing to run an audio portion of the plug-in.

14. The apparatus of claim 13, wherein the browser is configured to send the message to the plug-in based on the first web page being hidden and based on a power level of the apparatus being at or below a threshold.

15. The apparatus of claim 13, wherein the browser is configured to send a second message to the plug-in based on the first web page becoming visible, the second message being configured to cause the plug-in to resume playing the video portion.

16. The apparatus of claim 13, wherein the browser is configured to:
- open the first web page within a first tab of the browser based on the first file received from the first website, the first file including the at least one instruction to launch the plug-in;
- launch the plug-in based on the at least one instruction;
- open a second tab of the browser based on input received from a user, the opening the second tab including hiding the first web page and the first tab; and
- based on the first web page and the first tab being hidden, send the message to the plug-in, the message being configured to cause the plug-in to pause or terminate the video portion of the plug-in while continuing to run the audio portion of the plug-in.

17. The apparatus of claim 13, wherein the browser is further configured to send a video stop message to the first website, the video stop message instructing the first website to stop streaming video data to the apparatus.

18. A method comprising:
- opening, by a computing system, a first web page within a browser based on a first file received from a first website, the first file including video content and audio content associated with the first web page;
- running the video content and audio content; and
- based on the first web page becoming hidden, pausing or terminating the video content associated with the first web page while continuing to run the audio content associated with the first web page.

19. The method of claim 18, wherein the pausing or terminating includes pausing or terminating the video content while continuing to run the audio content based on the web page being hidden and based on a power level of the computing system being at or below a threshold.

20. The method of claim 18, further comprising resuming playing the video content based on the first web page becoming visible.

21. The method of claim 18, wherein the method comprises:
- opening the first web page within a first tab of the browser based on the first file received from the first website, the first file including the video content and the audio content;
- running the video content and the audio content;
- opening a second tab of the browser based on input received from a user, the opening the second tab including hiding the first web page and the first tab; and
- based on the first web page and the first tab being hidden, pausing or terminating the video content while continuing to run the audio content.

22. The method of claim 18, further comprising sending a video stop message to the first website, the video stop message instructing the first website to stop streaming video content to the computing system.

* * * * *